United States Patent
Kuo et al.

(10) Patent No.: US 6,996,762 B2
(45) Date of Patent: Feb. 7, 2006

(54) METHODS AND APPARATUS OF SIGNAL DEMODULATION COMBINING WITH DIFFERENT MODULATIONS AND CODING FOR WIRELESS COMMUNICATIONS

(75) Inventors: Wen-Yi Kuo, Morganville, NJ (US); Raafat Kamel, Little Falls, NJ (US); Jie Lai, Belle Mead, NJ (US)

(73) Assignee: Intel Corporation, Santa Clara, CA (US)

( * ) Notice: Subject to any disclaimer, the term of this patent is extended or adjusted under 35 U.S.C. 154(b) by 284 days.

(21) Appl. No.: 10/125,644

(22) Filed: Apr. 19, 2002

(65) Prior Publication Data
US 2003/0145269 A1 Jul. 31, 2003

Related U.S. Application Data
(60) Provisional application No. 60/286,157, filed on Apr. 24, 2001.

(51) Int. Cl.
*H04L 1/18* (2006.01)
*H03M 13/00* (2006.01)
*G06F 11/08* (2006.01)

(52) U.S. Cl. .................... 714/749; 714/755; 714/794
(58) Field of Classification Search ............ 714/748, 714/749, 750, 755, 758, 786
See application file for complete search history.

(56) References Cited

U.S. PATENT DOCUMENTS

6,662,331 B1 * 12/2003 Kang .................. 714/755
6,704,898 B1 * 3/2004 Furuskar et al. ........... 714/751

* cited by examiner

*Primary Examiner*—Albert Decady
*Assistant Examiner*—James C Kerveros
(74) *Attorney, Agent, or Firm*—Rita M. Wisor (57) ABSTRACT

According to an embodiment of the invention, the information is transmitted in symbols encoded at a source to a destination. A log likelihood ratio is respectively calculated for each of the encoded symbols. The calculated log likelihood ratios for the information bits are accumulated where the contribution from each of the encoded symbols is accounted for in the accumulating step. Each of the information bits is decoded according to the accumulated log likelihood ratios. An acknowledgment (ACK) is sent to the source for each block of the decoded information bits that passed the error check. A negative acknowledgment (NACK) is sent to the source for each block of the decoded information bits that did not pass the error check. After the source receives the negative acknowledgment (NACK), the encoded symbols are retransmitted to the destination.

51 Claims, 4 Drawing Sheets

METHODS AND APPARATUS OF SIGNAL DEMODULATION COMBINING WITH DIFFERENT MODULATIONS AND CODING FOR WIRELESS COMMUNICATIONS

RELATED APPLICATIONS

The present invention relates to and claims priority of U.S. Provisional Patent Application 60/286,157 filed on Apr. 24, 2001, having common inventorship and assignee, which is incorporated herein by reference.

BACKGROUND OF THE INVENTION

1. Field of the Invention

The present invention generally relates to encoding and decoding in data communications and more particularly, to a novel encoding and decoding method and associated architectures for processing information bits with different modulation and coding.

2. Description of the Related Art

In wireless communications, dynamic adjustment or switching of modulation schemes and channel coding can yield better performance or system throughput when channel (or data path) conditions vary. When channel conditions are relatively adverse, modulation and coding are respectively adjusted to lower-order modulation schemes and lower-rate coding. Conversely, when channel conditions are relatively favorable, modulation and coding are respectively adjusted to higher-order modulation schemes and higher-rate coding. Exemplary lower-order modulation schemes in the art include quaternary phase shift keying or QPSK. Exemplary higher-order modulation schemes include quadrature amplitude modulation or QAM. As information are being transmitted between a source (e.g., a base station) and a destination (e.g., a mobile device), the channel conditions are monitored for determining whether adjustment of the modulation and coding is needed.

Similar to the data transmission via the wireline, wireless transmission of a particular packet or data may not succeed at the first instance due to interference in the channel. Multiple transmissions of the same data can improve system performance particularly if the receiver can combine multiple transmissions for demodulating and decoding the signals. However, such combining in the prior art only applies to signals with the same modulation and channel coding schemes. Thus there exists a dilemma that either 1) the transmitter will have to change the modulation and/or coding according to the channel conditions with the receiver abandoning previously received signals of the same information, or 2) the transmitter will have to maintain the same modulation and coding until the packet or burst of data is successfully received.

There is therefore a need for a novel encoding and decoding method and associated architectures for processing data with different modulation and coding that advantageously overcome the signal combining problems and other problems in the art as set forth herein.

SUMMARY OF THE INVENTION

The present invention provides a novel encoding and decoding method and associated architectures for processing data with different modulation and coding. According to a particular embodiment of the method of the invention, the data are transmitted in encoded symbols from a source to a destination. The information bits are encoded at the source, which may be a single transmitter or a plurality of transmitters. The encoded symbols can be transmitted with spatial diversity (i.e., from a plurality of transmitters at the source) or without spatial diversity (i.e., from a single transmitter at the source). The encoded symbols can also be transmitted at different time intervals, i.e., in time diversity. A log likelihood ratio is respectively calculated for each of the information bits based on the received encoded symbols. The calculated log likelihood ratios for the information bits are accumulated where the contribution from each of the encoded symbols is accounted for or factored into the accumulating step. Each of the information bits is decoded according to the accumulated log likelihood ratios. An error check (e.g., a cyclical redundancy check) is respectively conducted for a block of the decoded information bits. If it is determined that the error check is passed, an acknowledgment (ACK) is sent to the source for the block of the decoded information bits that passed the error check. If it is determined that the error check is not passed, a negative acknowledgment (NACK) is sent to the source for the block of the decoded information bits that did not pass the error check. After the source receives the negative acknowledgment (NACK), the encoded symbols are retransmitted to the destination.

BRIEF DESCRIPTION OF THE DRAWINGS

The foregoing and other advantages and features of the invention will become more apparent from the detailed description of the preferred embodiments of the invention given below with reference to the accompanying drawings (not necessarily drawn to scale) in which.

DETAILED DESCRIPTION OF THE PREFERRED EMBODIMENTS

Figure 1:
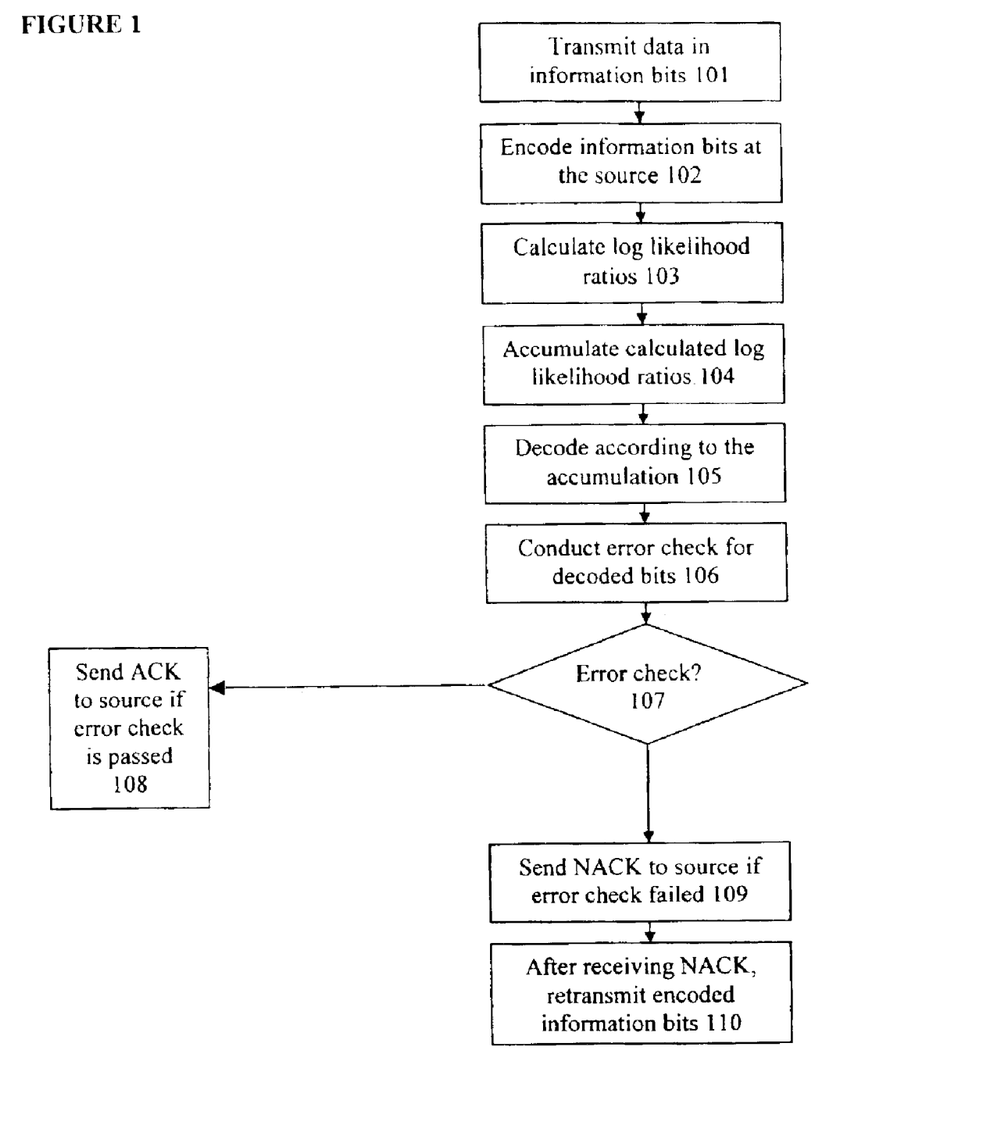
FIG. 1 is a flow diagram generally illustrating the method for encoding and decoding data according to an embodiment of the method of the invention.
Figure 2:
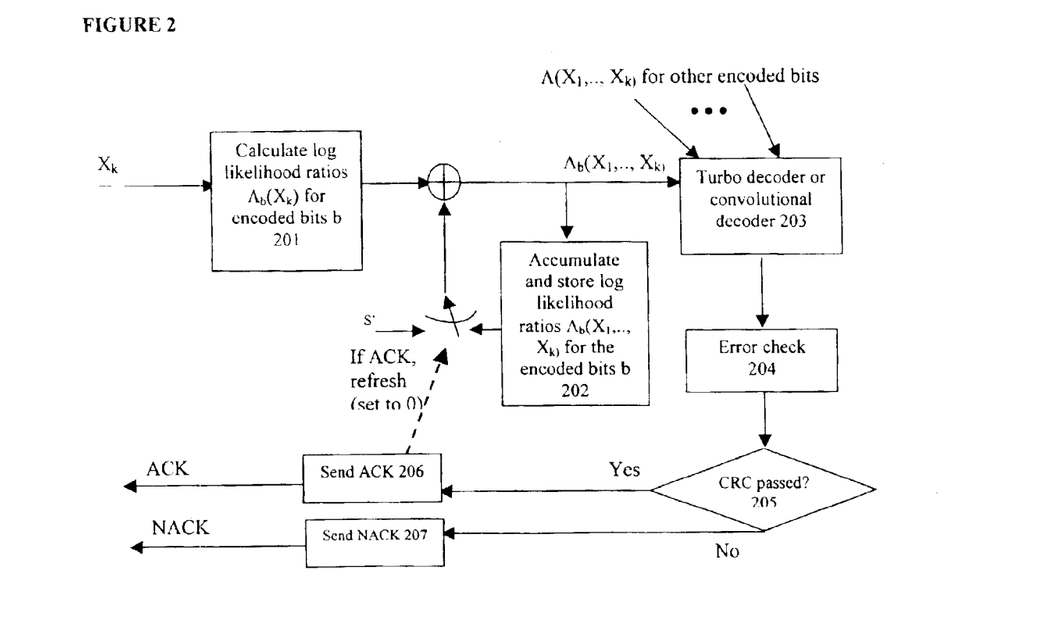
FIG. 2 is a block diagram generally illustrating a receiver architecture for receiving and decoding the data according to a particular embodiment of the invention.

FIGS. 1 and 2 are respectively a flow diagram and a block diagram generally illustrating the method and receiver architecture for transmitting data according to an embodiment of the method of the invention. As the information bit b is transmitted from a source to a destination (step 101), the information bit is encoded at the source into encoded symbols $X_1, X_2, X_3, \ldots X_k$ (step 102). At the calculator or processor 201 in the receiver, the log likelihood ratios $\Lambda_b(X_k)$ for each information bit b based on the received encoded symbols are respectively calculated (step 103). At the accumulator 202, the log likelihood ratios $\Lambda_b(X_1, X_2, X_3, \ldots X_k)$ calculated at processor 201 for the information bit b are accumulated and stored (step 104). At the decoder 203, the information bit b is decoded according to the accumulated log likelihood ratios (step 105). The accumulation of the log-likelihood ratios is done recursively so that the demodulation of information bit b can utilize the received multiple transmissions of encoded symbols that have embedded information on information bit b. Once the information block containing data bit b passed the error checking (CRC), where an ACK will be sent, the log-likelihood ratios are thus reset to zero and is ready to decode new sets of data.

The decoding of the information bit b can be performed in accordance with convolutional coding or turbo coding. Turbo codes allow coded modulation schemes for data communications capable of operation near Shannon capacity on bandwidth-limited data channels. Concatenated codes (such as turbo codes) use two constituent codes with some interleaving processing therebetween. A turbo code is formed by two constituent convolutional encoders, arranged in parallel, separated by an interleaver or a permuter. A convolution encoder transforms a stream or block of information bits into a block of coded bits. The function of the interleaver is to take each incoming block of data or information bits and rearrange them in a pseudo-random manner prior to encoding by the second convolutional encoder. For decoding the turbo code, a decoder including two soft-input soft-output (SISO) modules connected by an interleaver and an iterative algorithm that swaps from one SISO module to the other SISO module. A SISO algorithm is one that accepts a priori information at its input and produces a posteriori information at its output. Iterative decoding requires the individual decoders to not only determine the most likely transmitted sequence of information bits but to also yield a soft decision which is a measure of the likelihood or confidence of each bit in that sequence. A SISO decoder is a soft decision block decoding algorithm with soft output information. For turbo decoding, multiple iterations of soft-decision decoding are performed. The first SISO decoder outputs the decoded data or information bits and a reliability metric associated with each information bit for the soft decision. The reliability metric determines how reliable the soft decision on each of the decoded bits. After interleaving or permutation, the reliability metric is fed to the second SISO decoder for improving the reliability of the decoded bits. The reliability metric from the second SISO decoder is then fed to the first SISO decoder, where the process is repeatedly implemented.

At the error checker 204, error checks (e.g., a cyclical redundancy check or CRC) are performed for a block of information bits (step 106). A CRC is a mathematical method that permits errors in long runs of data to be detected with a very high degree of accuracy. According to the CRC, the entire block of data is treated as a long binary number or polynomial that is divided by a conveniently small number where the remainder is used as the check value that is tacked onto the end of the data block. Choosing a prime number as the divisor provides excellent error detection. The number or polynomial representing the complete block (main data plus CRC value) is always a multiple of the original divisor, so using the same divisor always results in a new remainder of zero. This means that the same division process can be used to check incoming data as is used to generate the CRC value for outgoing data. At the transmitter, the remainder is (usually) non-zero and is sent immediately after the real data. At the receiver, the entire data block is checked and if the remainder is zero, then the data transmission is confirmed.

At the logic control 205, it is determined whether an error check is passed or failed (step 107). If the error check is passed, an acknowledgment (ACK) is sent from an ACK sender 206 (step 108). Pursuant to the ACK sent from the ACK sender 206, the switch S' re-initializes or sets to zero for adding or summing with the log likelihood ratios. If the error check failed, a negative acknowledgment (NACK) is sent from a NACK sender 207 (step 109). After the NACK is received at the source, the encoded symbols are retransmitted to the destination (step 110).

Figure 3:
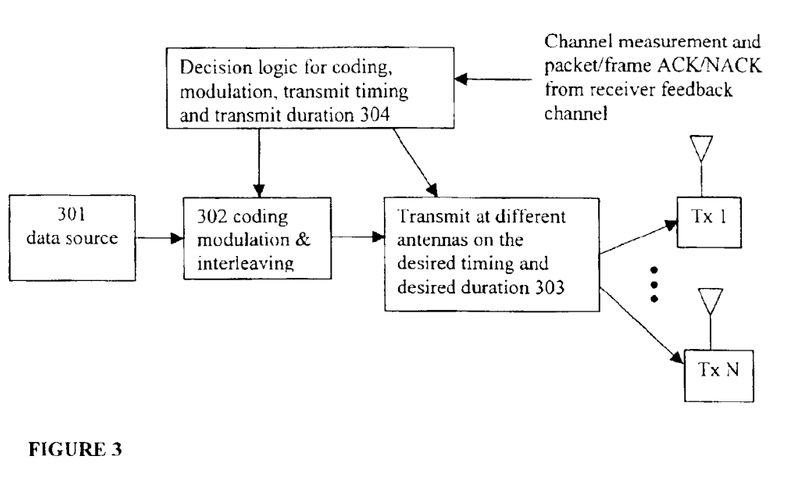
FIG. 3 is a block diagram illustrating an exemplary embodiment of an architecture at the source having a plurality of transmitters for transmitting and encoding the data according to the invention.
Figure 4:
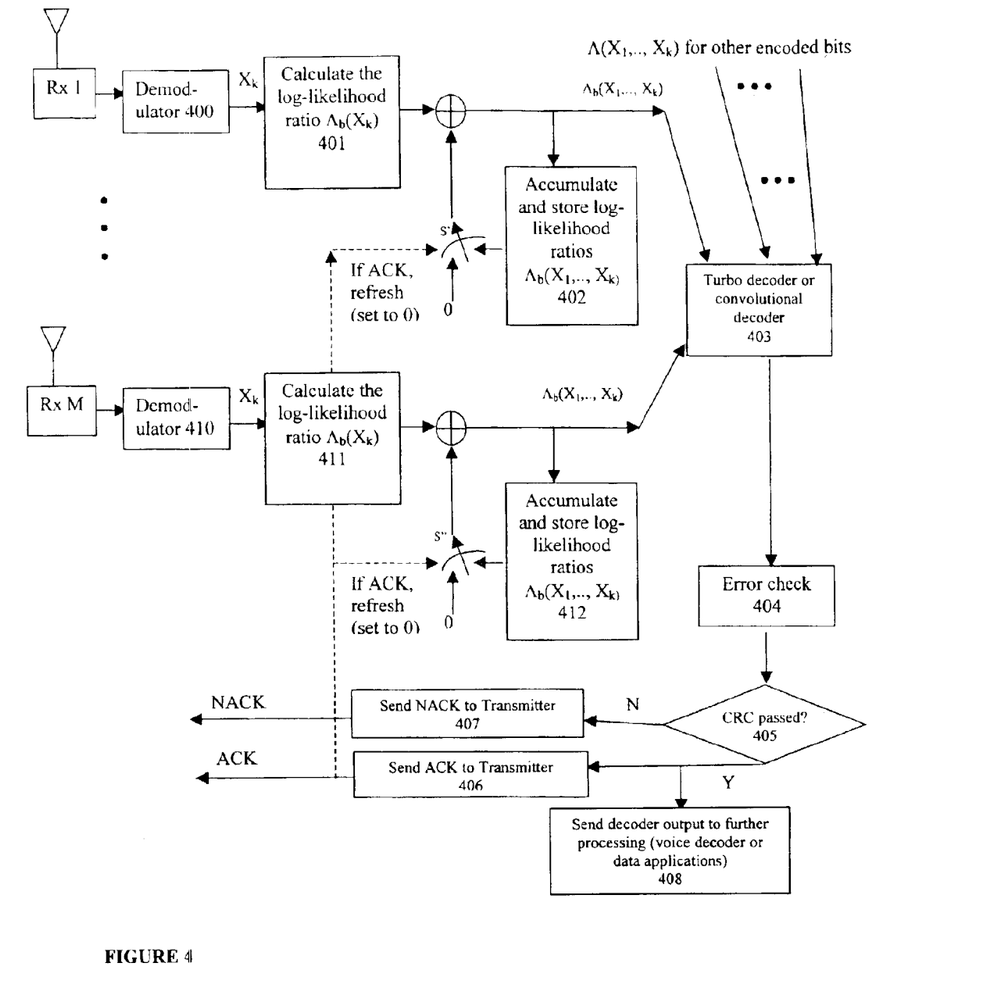
FIG. 4 is a block diagram illustrating an exemplary embodiment of an architecture at the destination having a plurality of receivers for receiving and decoding the data according to the invention.

FIG. 3 is a block diagram that illustrates an exemplary embodiment of an architecture at the source having a plurality of transmitters for transmitting and encoding the data according to the invention. FIG. 4 is a block diagram that illustrates an exemplary embodiment of an architecture at the destination having a plurality of receivers for receiving and decoding the data according to the invention. As the data are transmitted in encoded symbols $X_1, X_2, X_3, \ldots X_k$ from a source with data source 301 to a destination having a plurality of transmitters Tx 1, Tx 2, . . . Tx N, the information bits are encoded at the coder 302 into encoded symbols for transmission 303 coupled with the transmitters (Tx 1, Tx 2, . . . Tx N) to the destination having a plurality of receivers Rx 1, Rx 2, . . . Rx M. For turbo coding, the coding, modulation and interleaving can be performed at the decoder 302 in conjunction with decision logic 304 for coding, modulation, transmission timing and duration processing. The decision logic 304 also receives the ACK and NACK messages from the destination.

At the calculator or processor (401, 411 . . . ) corresponding to each receiver (Rx 1, Rx 2, . . . Rx M), the log likelihood ratio $\Lambda_b(X_k)$ for each information bit b are respectively calculated. At the accumulator (402, 412, . . . ) corresponding to each receiver (Rx 1, Rx 2, . . . Rx M), the log likelihood ratio $\Lambda_b(X_1, X_2, X_3, \ldots X_k)$ calculated at the calculator or processor (401, 411 . . . ) for the information bit b are accumulated and stored. At the decoder 403, the information bit b is decoded according to the accumulated log likelihood ratios. The accumulation is done in a recursive manner where the log likelihood ratios, as they are calculated and accumulated, are added or summed, corresponding to each receiver (Rx 1, Rx 2, . . . Rx M), with the incoming log likelihood ratios from the corresponding processor (401, 411 . . . ). The decoding of the information bit b can be performed in accordance with convolutional coding or turbo coding at the decoder 403.

At the error checker 404, error checks (e.g., a cyclical redundancy check or CRC) are performed for each block of the decoded information bits. At the logic control 405, it is determined whether an error check is passed or failed. If the error check is passed, an acknowledgment (ACK) is sent from an ACK sender 406 and the decoded information bits can be output to a voice decoder or other data applications 408 for further data processing. Pursuant to the ACK sent from the ACK sender 406, the switch (S', S'' . . . ) corresponding to the particular receiver re-initializes or sets to zero for adding or summing with the log likelihood ratios. If the error check failed, a negative acknowledgment (NACK) is sent from a NACK sender 407. After the NACK is received at the decision logic 304 of the source, the encoded symbols are retransmitted to the destination.

A preferred embodiment of the method of the invention is described in further detail below with mathematical representations in conjunction with FIGS. 1 and 2.

Assume the information bit b be embedded in the encoded symbols and transmitted, the encoded (and modulated, if needed) symbol X be received at one receiver and another encoded symbol Y are received at the same receiver at a different time or at a different receiver at the same time or at a different time. The received encoded symbol Y can have the same or different encoding and/or modulation as the received encoded symbol X. Moreover, the received encoded symbol Y can be transmitted from the same or different transmitter or a plurality of transmitters at the source, e.g., in spatial diversity. For spatial or space diversity, if a receiver provides multiple antennas, the distance between the receiving antennas is made large enough to ensure independent fading where a plurality of transmission paths or channels are available for carrying and receiving uncorrelated and generally the same message or information with independent fading characteristics.

A posteriori probability (APP) of for the information b is calculated for the basis of the maximum a posteriori probability (MAP) therefor. MAP is an estimation of the most likely information bit to have been transmitted in a coded sequence of information. A posteriori information is the soft output of a SISO decoder. The a posteriori probability or APP, the base for MAP, can be described as follows:

$$P(b|X,Y) = \frac{P(b,X,Y)}{P(X,Y)} = \frac{P(X,Y|b)P(b)}{P(X,Y)} \quad \text{Eq. 1}$$

$$= \frac{P(X|b)P(Y|b)P(b)}{P(X,Y)} = P(b|X)P(Y|b)\frac{P(X)}{P(X,Y)}$$

The information b is selected out of the received encoded symbols X and Y such that the APP or P(b|X,Y) is maximized, which is mathematically represented in the following Equation 2:

$$\hat{b}_{MAP}|X,Y = \arg\left\{\max_b \{P(b|X)P(Y|b)\}\right\} \quad \text{Eq. 2}$$

where the first term P(b|X) provides the extrinsic information regarding the information b via the encoded symbol X, and the second term P(Y|b) is the probability to receive encoded symbol Y given the hypothesis that b is transmitted.

The received encoded symbols can be further expanded into a series of mathematical observations for obtaining the APP according to contribution of each of the observations. As the received encoded symbols are expanded into a series of mathematical observations, a log of conditional probability is separately calculated for each of the observations. The calculated logs of conditional probability for the observations are summed or accumulated to obtain the APP which is the base for MAP. That is, the received encoded symbols X can be expanded into a series of observations $X_1, X_2, \ldots, X_M$ to obtain the MAP in the following mathematical representation in Equation 3:

$$\hat{b}_{MAP}|X_1, \ldots, X_M = \arg\left\{\max_b \{P(b|X_1, \ldots, X_{M-1})P(X_M|b)\}\right\} \quad \text{Eq. 3}$$

$$= \arg\left\{\max_b \{P(b|X_1)P(X_2|b) \cdot \ldots \cdot P(X_{M-1}|b)P(X_M|b)\}\right\}$$

$$= \arg\left\{\max_b \left\{\ln[P(b)] + \sum_{k=1}^{M} \ln[P(X_k|b)]\right\}\right\}$$

$$= \arg\left\{\max_b \{\ln[P(b|X_1, \ldots, X_{M-1})] + \ln[P(X_M|b)]\}\right\}$$

where $$P(b|X_1) = \frac{P(X_1|b)P(b)}{P(X_1)} \quad \text{Eq. 4}$$

The final two forms of Eq. 3 represent two implementation methodologies according to the invention. According to the summation $$\sum_{k=1}^{M} \ln[P(X_k|b)],$$

the log of the conditional probability of the mathematical observations with the given information b, $\ln[P(X_k|b)]$, is calculated for each observation $X_k$, which are then summed together. Accordingly, the contribution from each observation $X_k$ can be separately calculated. The summation $\ln[P(b|X_1, \ldots, X_{M-1})]$ and $\ln[P(X_M|b)]$ provides that the log for the a posteriori probability (APP) can be calculated in an accumulated fashion by adding the contribution from each new mathematical observation into the accumulated sum.

In the case that the prior knowledge of information b, i.e., P(b), is unknown or the information b is equally probable, the MAP is thus obtained as $$\hat{b}_{ML}|X_1, \ldots, X_M = \arg\left\{\max_b \left(\sum_{k=1}^{M} \ln[P(X_k|b)]\right)\right\} \quad \text{Eq. 5}$$

$$= \arg\left\{\max_b \{\ln[P(X_1, \ldots, X_{M-1}|b)] + \ln[P(X_M|b)]\}\right\}$$

In digital communications, binary representation is often used. The log likelihood ratio of information b with the mathematical observation $X_k$ can be obtained as, in binary representation:

$$\Lambda_b(X_k) = \ln\{P(X_k|b=1)\} - \ln\{P(X_k|b=-1)\} \quad \text{Eq. 6}$$

$$= \ln\left\{\frac{1}{M}\sum_{Q_j \in S_{b=1}} P(X_k|Q_j)\right\} -$$

$$\ln\left\{\frac{1}{M}\sum_{Q_j \in S_{b=-1}} P(X_k|Q_j)\right\}$$

$$= \ln\left\{\frac{1}{M}\sum_{Q_j \in S_{b=1}} \prod_{l=1}^{L} \frac{1}{\pi V_{k,l}}\exp\right.$$

$$\left.\left(-\frac{|x_{k,l} - Q_j \hat{w}_{k,l} N_T \hat{A}_T(k,l)|^2}{V_{k,l}}\right)\right\} -$$

$$\ln\left\{\frac{1}{M}\sum_{Q_j \in S_{b=-1}} \prod_{l=1}^{L} \frac{1}{\pi V_{k,l}}\exp\right.$$

$$\left.\left(-\frac{|x_{k,l} - Q_j \hat{w}_{k,l} N_T \hat{A}_T(k,l)|^2}{V_{k,l}}\right)\right\}$$

where, in code division multiple access or CDMA, a rake receiver is used with L paths or multiple antennas(or fingers) using the same modulation and coding, $x_{k,l}$ is the received signal at the $l^{th}$ path in observation $X_k$ and $X_k = [x_{k,l}, \ldots, x_{k,L}]$ $w_{k,l}$ is the multiplicative distortion (i.e., fade) at the $l^{th}$ path associated with observation $X_k$ and $\hat{w}_{k,l}$ is its estimate, $N_T$ is the spreading factor (chips per symbol), $A_T(k,l)$ is the transmitted amplitude at the $l^{th}$ path associated with observation $X_k$ and $\hat{A}_T(k,l)$ is its estimate $Q_j$ is the hypothesized modulated symbol (e.g., 3-j in 16QAM) which belongs to the set determined by a hypothesized bit b, $S_{b=1}$, is the hypothesized set of modulated symbols whose associated bit b=1, $S_{b=-1}$, is the hypothesized set of modulated symbols whose associated bit b=-1, $V_{k,l}$ is the variance at the $l^{th}$ path associated with observation $X_k$, $$V_{k,l} = E\left[\left|x_{k,l} - Q_j \hat{w}_{k,l} N_T \hat{A}_T(k, l)\right|^2\right] \qquad \text{Eq. 7}$$

$$= N_T^2 |Q_j|^2 E\left[\left|w_{k,l} A_T(k, l) - \hat{w}_{k,l} \hat{A}_T(k, l)\right|^2\right] + N_T J(k, l)$$

$J(k,l)$ is the per chip interference density at the $l^{th}$ path associated with observation $X_k$ and is equal to $$J(k, l) = I_{oc}(k) + \sum_{\substack{m=1 \\ m \neq l}}^{L} E\left[|w_{k,m}|^2\right] \qquad \text{Eq. 8}$$

$I_{oc}(k)$ is the per chip interference density of the transmission from the source (e.g., base stations) associated with observation $X_k$, $$\sum_{\substack{m=1 \\ m \neq l}}^{L} E\left[|w_{k,m}|^2\right]$$

represents the interference power from other paths (but the same source or base station) associated with observation $X_k$.

Since the summation in Eq. 6 is based on exponential terms, an approximation of the log-likelihood ratio associated with observation $X_k$ can be obtained as $$\Lambda_b(X_k) = \ln\{P(X_k \mid b = 1)\} - \ln\{P(X_k \mid b = -1)\} \qquad \text{Eq. 9}$$

$$= \ln\left\{\frac{1}{M} \sum_{Q_j \in S_{b=1}} P(X_k \mid Q_j)\right\} - \ln\left\{\frac{1}{M} \sum_{Q_j \in S_{b=-1}} P(X_k \mid Q_j)\right\}$$

$$\approx \ln\left\{\max_{Q_j \in S_{b=1}} P(X_k \mid Q_j)\right\} - \ln\left\{\max_{Q_j \in S_{b=-1}} P(X_k \mid Q_j)\right\}$$

$$= \max_{Q_j \in S_{b=1}} \sum_{l=1}^{L} \frac{|x_{k,l} - Q_j \hat{w}_{k,l} N_T \hat{A}_T(k, l)|^2}{V_{k,l}} -$$

$$\min_{Q_j \in S_{b=-1}} \sum_{l=1}^{L} \frac{|x_{k,l} - Q_j \hat{w}_{k,l} N_T \hat{A}_T(k, l)|}{V_{k,l}}$$

Further simplification of Eq. 9 can also be implemented. As the channel estimation is of high quality, $V_{k,l}$ in Eq. 8 can thus be approximated as $$V_{k,l} = N_T J(k,l)$$

where:

$$\Lambda_b(X_k) \approx \min_{Q_j \in S_{b=1}} \sum_{l=1}^{L} \frac{|x_{k,l} - Q_j \hat{w}_{k,l} N_T \hat{A}_T(k, l)|^2}{J(k, l)} - \qquad \text{Eq. 10}$$

$$\min_{Q_j \in S_{b=-1}} \sum_{l=1}^{L} \frac{|x_{k,l} - Q_j \hat{w}_{k,l} N_T \hat{A}_T(k, l)|^2}{J(k, l)}$$

For soft decision combining in the rake receiver, generally only the multiple antennas or fingers within a few decibels (dB) of the strongest finger are combined so $J(k,l)$ is relatively close for all l, as follows:

$$\Lambda_b(X_k) \approx C_x(k) \left[ \min_{Q_j \in S_{b=1}} \sum_{l=1}^{L} |x_{k,l} - Q_j \hat{w}_{k,l} N_T \hat{A}_T(k, l)|^2 - \qquad \text{Eq. 11} \right.$$

$$\left. \min_{Q_j \in S_{b=-1}} \sum_{l=1}^{L} |x_{k,l} - Q_j \hat{w}_{k,l} N_T \hat{A}_T(k, l)|^2 \right]$$

where $C_x(k)$ is a weighting coefficient for observation $X_k$, and is inversely proportional to $J(k,l)$ in Eq. 8. For instance, assuming the L paths be of roughly equal average power, one can obtain $$C_x(k) = \frac{1}{\frac{I_{oc}(k)}{I_{or}(k)} + \left(1 - \frac{1}{L}\right)} \qquad \text{Eq. 12}$$

Note that the ratio $I_{oc}(k)/I_{or}(k)$, where $I_{or}(k)$ denotes the received power from the serving base station, discloses the major interference scenario at time of observation $X_k$.

The resultant log-likelihood ratio with all the observations $(X_1, X_2, \ldots, X_M)$ can then be obtained as $$\Lambda_b(X_1, \cdots, X_M) = \ln\{P(X_1, \cdots, X_M \mid b = 1)\} - \qquad \text{Eq. 13}$$

$$\ln\{P(X_1, \cdots, X_M \mid b = -1)\}$$

$$= \sum_{k=1}^{M} \Lambda_b(X_k) = \Lambda_b(X_1, \cdots,$$

$$X_{M-1}) + \Lambda_b(X_M)$$

where both the individual summation and accumulation forms can be implemented.

In case the second strongest term is so close to the strongest term such that the approximation in Eq. 9 cannot be used, a 2-term solution can then be used as follows:

$$\Lambda_b(X_k) = \ln\left\{\frac{1}{M} \sum_{Q_j \in S_{b=1}} P(X_k \mid Q_j)\right\} - \ln\left\{\frac{1}{M} \sum_{Q_j \in S_{b=-1}} P(X_k \mid Q_j)\right\} \qquad \text{Eq. 14}$$

$$\approx \ln\left\{\max_{Q_j \in S_{b=1}} P(X_k \mid Q_j) + \max_{Q_j \in S_{b=1}} 2^{nd} P(X_k \mid Q_j)\right\} -$$

$$\ln\left\{\max_{Q_j \in S_{b=-1}} P(X_k \mid Q_j) + \max_{Q_j \in S_{b=-1}} 2^{nd} P(X_k \mid Q_j)\right\}$$

$$= \min_{Q_j \in S_{b=1}} \sum_{l=1}^{L} \frac{|x_{k,l} - Q_j \hat{w}_{k,l} N_T \hat{A}_T(k, l)|^2}{V_{k,l}} +$$

$$\ln\left(2 + \sum_{n=1}^{N} \frac{\Delta_{k,b=1}^n}{n!}\right) -$$

-continued $$\min_{Q_j \in S_{b=-1}} \sum_{l=1}^{L} \frac{|x_{k,l} - Q_j \hat{w}_{k,l} N_T \hat{A}_T(k,l)|^2}{V_{k,l}} - \ln\left(2 + \sum_{n=-1}^{N} \frac{\Delta_{k,b=-1}^n}{n!}\right)$$

where
max $2^{nd}$ is the function yields the second largest term in a series,
min $2^{nd}$ is the function yields the second smallest term in a series,
N is the number of Taylor series truncation for exponential terms, $$\Delta_{k,b=1} = \min_{Q_j \in S_{b=1}} \sum_{l=1}^{L} \frac{|x_{k,l} - Q_j \hat{w}_{k,l} N_T \hat{A}_T(k,l)|^2}{V_{k,l}} - \min_{Q_j \in S_{b=1}} 2^{nd} \sum_{l=1}^{L} \frac{|x_{k,l} - Q_j \hat{w}_{k,l} N_T \hat{A}_T(k,l)|^2}{V_{k,l}}$$

$$\Delta_{k,b=-1} = \min_{Q_j \in S_{b=-1}} \sum_{l=1}^{L} \frac{|x_{k,l} - Q_j \hat{w}_{k,l} N_T \hat{A}_T(k,l)|^2}{V_{k,l}} - \min_{Q_j \in S_{b=-1}} 2^{nd} \sum_{l=1}^{L} \frac{|x_{k,l} - Q_j \hat{w}_{k,l} N_T \hat{A}_T(k,l)|^2}{V_{k,l}}$$

Eq. 15

Similarly, approximations using multiple terms (more than 2 terms) that are very close to the strongest term can be derived from Eq. 14. Also note that the approximation using $$V_{k,l} = N_T J(k,l)$$

and the approximation using $C_x(k)$ can also be applied to Eq. 14 and Eq. 15.

Although the invention has been particularly shown and described in detail with reference to the preferred embodiments thereof, the embodiments are not intended to be exhaustive or to limit the invention to the precise forms disclosed herein. It will be understood by those skilled in the art that many modifications in form and detail may be made without departing from the spirit and scope of the invention. Similarly, any process steps described herein may be interchangeable with other steps to achieve substantially the same result. All such modifications are intended to be encompassed within the scope of the invention, which is defined by the following claims and their equivalents.

We claim:

1. A method for encoding and decoding data comprising the steps of:
   (a) encoding information bits at the source into symbols;
   (b) transmitting the encoded symbols from a source to a destination;
   (c) respectively calculating a log likelihood ratio for each of the information bits based on the encoded symbols received at the destination;
   (d) recursively accumulating the calculated log likelihood ratios for the information bits wherein contribution from each of the encoded symbols is factored into the accumulating step;
   (e) decoding each of the information bits according to the accumulated log likelihood ratios;
   (f) respectively conducting an error check for a block of decoded information bits;
   (g) determining if the error check is passed for the block of decoded information bits;
   (h) if it is determined in step (g) that the error check is passed, sending an acknowledgment (ACK) to the source for the block of decoded information bits that passed the error check;
   (i) if it is determined in step (g) that the error check is not passed, sending a negative acknowledgment (NACK) to the source for the block of decoded information bits that did not pass the error check; and
   (j) after the source receives the negative acknowledgment (NACK) sent in step (i), retransmitting the encoded symbols to the destination.

2. The method of claim 1 wherein the error check is a cyclical redundancy check (CRC).

3. The method of claim 1 wherein the encoding is turbo coding.

4. The method of claim 1 further comprising the step of resetting the log likelihood ratios to zero if it is determined in step (g) that the error check is passed.

5. The method of claim 1 wherein the encoded symbols are transmitted in spatial diversity.

6. The method of claim 1 wherein the encoded symbols are transmitted in time diversity.

7. The method of claim 1 further comprising the steps of:
   modulating the information bits; and
   demodulating the information bits.

8. The method of claim 1 further comprising receiving the encoded symbols at the destination.

9. The method of claim 8 further comprising the step of calculating a posteriori probability (APP) for the encoded information bits according to an equation $$P(b \mid X, Y) = \frac{P(b, X, Y)}{P(X, Y)}$$
$$= \frac{P(X, Y \mid b) P(b)}{P(X, Y)}$$
$$= \frac{P(X \mid b) P(Y \mid b) P(b)}{P(X, Y)}$$
$$= P(b \mid X) P(Y \mid b) \frac{P(X)}{P(X, Y)}$$

wherein P represents a posteriori probability, b represents one of the transmitted information bits, X represents one received encoded symbol, Y represents another received encoded symbol.

10. The method of claim 1 further comprising the step of calculating a posteriori probability (APP) for the information bits.

11. The method of claim 10 further comprising the step of selecting the information bit b by maximizing the a posteriori probability.

12. The method of claim 10 further comprising the step of selecting the information bit b by maximizing the a posteriori probability (APP) wherein the maximized APP is equivalent to, according to an equation:

$$\hat{b}_{MAP} \mid X, Y = \arg\left\{\max_b \{P(b \mid X) P(Y \mid b)\}\right\}$$

wherein $P(b|X)$ provides extrinsic information regarding the transmitted information bit b from the received encoded symbols X and $P(Y|b)$ is the probability to receive encoded symbols Y on the hypothesis that b is the embedded transmitted information bit.

13. The method of claim 10 further comprising the steps of:
   expanding the encoded symbols into a series of mathematical observations; and
   obtaining the APP according to contribution of each of the observations.

14. The method of claim 10 further comprising the steps of:
   expanding the encoded symbols into a series of mathematical observations;
   separately calculating a log of conditional probability for each of the observations; and
   summing the calculated logs of conditional probability for the observations to obtain the APP.

15. A system for encoding and decoding data comprising:
   a source transmitting information bits in encoded symbols;
   a destination receiving the encoded symbols from the source;
   an encoder at the source encoding the information bits:
   a calculator at the destination respectively calculating a log likelihood ratio for each information bit based on the received encoded symbols;
   an accumulator at the destination recursively accumulating the calculated log likelihood ratios for the information bits and factoring in contribution from each of the received encoded symbols;
   a decoder at the destination decoding the transmitted encoded symbols;
   an error checker at the destination respectively conducting an error check for a block of the decoded information bits;
   wherein an acknowledgment (ACK) is sent to the source for each block of the decoded information bits that pass the error check, and a negative acknowledgment (NACK) is sent to the source for each block of the decoded information bits that do not pass the error check.

16. The system of claim 15 wherein the source retransmits the encoded symbols to the destination after receiving the negative acknowledgment (NACK) from the destination.

17. The system of claim 15 wherein the source further comprises a plurality of transmitters and the destination further comprises a plurality of receivers.

18. The system of claim 17 wherein each transmitter further comprises a decision logic for receiving the ACK and NACK from the destination.

19. The system of claim 17 wherein each transmitter further comprises a coder for encoding, modulating and interleaving the information bits for transmission by the transmitter.

20. The system of claim 17 wherein each receiver further comprises a demodulator for demodulating the information bits received at the receiver.

21. The system of claim 17 wherein each receiver further comprises a calculator respectively calculating a log likelihood ratio for each of the information bits based on the encoded symbols received at the receiver.

22. The system of claim 17 wherein each receiver further comprises an accumulator accumulating the calculated log likelihood ratios for the information bits received at the receiver and factoring in contribution from each of the encoded symbols received at the receiver.

23. The system of claim 17 wherein each receiver further comprising a re-initializing switch for summing the log likelihood ratios for the encoded information bits received at the receiver.

24. The system of claim 15 further comprising a re-initializing switch for summing the log likelihood ratios.

25. The system of claim 15 wherein the error check is a cyclical redundancy check (CRC).

26. The system of claim 15 wherein the encoding is turbo coding.

27. The system of claim 15 wherein the log likelihood ratios are reset to zero if it is determined that the error check is passed.

28. The system of claim 15 wherein the information bits are transmitted in spatial diversity.

29. The system of claim 15 wherein the information bits are transmitted in time diversity.

30. The system of claim 15 further comprising a calculator for calculating a posteriori probability (APP) for the encoded information bits.

31. The system of claim 30 further comprising a processor for maximizing the a posteriori probability (APP) by respectively selecting the encoded information bits.

32. The system of claim 30 further comprising:
   a processor expanding the encoded information bits into a series of mathematical observations; and
   wherein the APP is obtained according to contribution of each of the observations.

33. The system of claim 30 further comprising:
   a processor expanding the encoded information bits into a series of mathematical observations;
   another calculator separately calculating a log of conditional probability for each of the observations; and
   a summer summing the calculated logs of conditional probability for the observations to obtain the APP.

34. A base station transmitting information bits in encoded symbols to a device receiving the encoded symbols from the base station wherein the base station further comprises:
   an encoder encoding the information bits;
   wherein the mobile device further comprises:
   a calculator respectively calculating a log likelihood ratio for each information bit based on the received encoded symbols;
   an accumulator recursively accumulating the calculated log likelihood ratios for the information bits and factoring in contribution from each of the received encoded symbols:
   a decoder decoding the transmitted encoded symbols;
   an error checker respectively conducting an error check for a block of the decoded information bits;
   wherein an acknowledgment (ACK) is sent to the source for each block of the decoded information bits that pass the error check, and a negative acknowledgment (NACK) is sent to the source for each block of the decoded information bits that do not pass the error check.

35. The base station and the mobile device of claim 34 wherein the base station retransmits the encoded symbols to the mobile device after receiving the negative acknowledgment (NACK) from the mobile device.

36. The base station and the mobile device of claim 34 wherein the base station further comprises a plurality of transmitters and the mobile device further comprises a plurality of receivers.

37. The base station and the mobile device of claim 36 wherein each receiver further comprising a re-initializing switch for summing the log likelihood ratios for the encoded information bits received at the receiver.

38. The base station and the mobile device of claim 36 wherein each transmitter further comprises a decision logic for receiving the ACK and NACK from the mobile device.

39. The base station and the mobile device of claim 36 wherein each transmitter further comprises a coder for encoding, modulating and interleaving the information bits for transmission by the transmitter.

40. The base station and the mobile device of claim 36 wherein each receiver further comprises a demodulator for demodulating the information bits received at the receiver.

41. The base station and the mobile device of claim 36 wherein each receiver further comprises a calculator respectively calculating a log likelihood ratio for each of the information bits based on the encoded symbols received at the receiver.

42. The base station and the mobile device of claim 36 wherein each receiver further comprises an accumulator accumulating the calculated log likelihood ratios for the information bits received at the receiver and factoring in contribution from each of the encoded symbols received at the receiver.

43. The mobile device of claim 34 further comprising a re-initializing switch for summing the log likelihood ratios.

44. The base station and the mobile device of claim 34 wherein the error check is a cyclical redundancy check (CRC) and the encoding is turbo coding.

45. The base station and the mobile device of claim 34 wherein the log likelihood ratios are reset to zero if it is determined that the error check is passed.

46. The base station and the mobile device of claim 34 wherein the information bits are transmitted in spatial diversity.

47. The base station and the mobile device of claim 34 wherein the information bits are transmitted in time diversity.

48. The mobile device of claim 34 further comprising a calculator for calculating a posteriori probability (APP) for the encoded information bits.

49. The mobile device of claim 48 further comprising a processor for maximizing the a posteriori probability (APP) by respectively selecting the encoded information bits.

50. The mobile device of claim 48 further comprising:
  a processor expanding the encoded information bits into a series of mathematical observations; and
  wherein the APP is obtained according to contribution of each of the observations.

51. The mobile device of claim 48 further comprising:
  a processor expanding the encoded information bits into a series of mathematical observations;
  another calculator separately calculating a log of conditional probability for each of the observations; and
  a summer summing the calculated logs of conditional probability for the observations to obtain the APP.

* * * * *

UNITED STATES PATENT AND TRADEMARK OFFICE
CERTIFICATE OF CORRECTION

PATENT NO. : 6,996,762 B2  Page 1 of 1
APPLICATION NO. : 10/125644
DATED : February 7, 2006
INVENTOR(S) : Kuo et al.

It is certified that error appears in the above-identified patent and that said Letters Patent is hereby corrected as shown below:

Column 12, at line 38, after "a" and insert --mobile--.

Signed and Sealed this

Third Day of June, 2008

JON W. DUDAS
*Director of the United States Patent and Trademark Office*